(No Model.)
A. B. WARD.
MILK COOLER.
No. 264,003.  Patented Sept. 5, 1882.
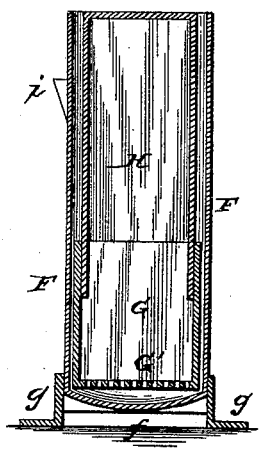
WITNESSES:
Arthur B Ward
INVENTOR,
by Louis Bagger & Co,
ATTORNEYS.

UNITED STATES PATENT OFFICE.

ARTHUR B. WARD, OF MILLINGTON, MICHIGAN.

MILK-COOLER.

SPECIFICATION forming part of Letters Patent No. 264,003, dated September 5, 1882.

Application filed January 30, 1882. (No model.)

*To all whom it may concern:*

Be it known that I, ARTHUR B. WARD, of Millington, in the county of Tuscola and State of Michigan, have invented certain new and useful Improvements in Milk-Coolers; and I do hereby declare that the following is a full, clear, and exact description of the invention, which will enable others skilled in the art to which it appertains to make and use the same, reference being had to the accompanying drawing, which forms a part of this specification, and in which the figure of drawing is a section.

My invention relates to apparatus for cooling milk and raising the cream from the milk; and it consists in the improvements hereinafter more fully set forth, and particularly pointed out in the claim.

The letter F represents the milk-cans, which are by preference of a square shape, so that they may be placed close together in the water-tank, leaving only a small body of water between them. These cans are made with an open top and dished bottom, *f*, and are provided with flanged legs *g*, the flanges of which may be slipped sidewise into grooves made in the bottom of the water-tank, so as to hold them firmly in place when the apparatus is in use. If desired, the cans F may each have a faucet in the center of their dished bottoms, which, when used, should be packed water-tight in a coinciding opening in the bottom of the water-tank. Each can F has a lug or shoulder, *i*, projecting from one of its sides, which may be slipped under a cross-brace, and thus serves as an additional means to hold the can firmly in its place. Each of the milk-cans F also has a removable strainer, G, with a bottom, G', of fine wire-cloth and a bail or handle, H. These strainers or skimmers are of such a shape as to fit snugly within their respective cans and rest on the bottom thereof, with the handle reaching up to the top rim of the can.

To use this apparatus the milk to be creamed is poured into the cans F. When the milk has "set" the cream is removed by lifting the strainers G G' H from the bottom of the cans, when they will lift up the whole body of cream, which may then be poured into a cream-can attached to one side of the tank. If the cans are made with bottom faucets, the skim-milk may be drawn off through these, but if not it may readily be drawn off through a siphon without removing the cans.

By making the can-bottoms concave they are easily cleaned without removing them from the tank, besides insuring perfect drainage of the skimmed milk.

Another advantage of this construction is that the dished bottom leaves a space between it and the wire-cloth bottom G' of the strainer, so that in lifting the latter it has room to bulge or sag without coming in direct contact with the bottom of the can, upon which fine particles of sand or other heavy impurities contained in the milk accumulate and by their adherence to the bottom of the strainer would be likely to become mixed with the cream as this is poured from the strainer.

Having thus described my improvement, I claim and desire to secure by Letters Patent of the United States—

In an apparatus for raising and skimming cream, as described, the combination of the milk-can F, having open top and dishing bottom, with the strainer composed of a box, G, fitting snugly within the can, and having a bottom, G', of fine wire-cloth, adapted to allow the milk to gravitate through, but to retain the collected cream, and having handles H, the space between the dishing bottom of the can and the flat wire-cloth strainer preventing contact of cream with the grit, &c., in the bottom of the can, as specified.

In testimony that I claim the foregoing as my own I have hereunto affixed my signature in presence of two witnesses.

ARTHUR BALDWIN WARD.

Witnesses:
CHAS. H. CARLETON,
DANIEL N. BLOCHER.